(12) United States Patent
Nica

(10) Patent No.: US 7,573,148 B2
(45) Date of Patent: Aug. 11, 2009

(54) BOUNDARY LAYER WIND TURBINE

(75) Inventor: Horia Nica, 101 Av Lavoisier, Quebec, Laval (CA) H7N 3J3

(73) Assignee: Horia Nica, Laval, Quebec (CA)

( * ) Notice: Subject to any disclaimer, the term of this patent is extended or adjusted under 35 U.S.C. 154(b) by 207 days.

(21) Appl. No.: 11/663,062

(22) PCT Filed: Feb. 24, 2006

(86) PCT No.: PCT/CA2006/000278

§ 371 (c)(1),
(2), (4) Date: Mar. 16, 2007

(87) PCT Pub. No.: WO2006/089425

PCT Pub. Date: Aug. 31, 2006

(65) Prior Publication Data

US 2007/0296219 A1    Dec. 27, 2007

(30) Foreign Application Priority Data

Feb. 28, 2005    (CA)  .................................. 2498635

(51) Int. Cl.
*F03D 9/00* (2006.01)
*H02P 9/04* (2006.01)
(52) U.S. Cl. .......................................... 290/55; 290/44
(58) Field of Classification Search .................. 290/43, 290/44, 54, 55; 415/4.5, 907, 4.2, 4.1, 2.1; 60/398; 416/132 B, 7
See application file for complete search history.

(56) References Cited

U.S. PATENT DOCUMENTS

| | | | |
|---|---|---|---|
| 1,061,142 A | 5/1913 | Tesla | |
| 2,484,291 A * | 10/1949 | Hays | 417/336 |
| 3,339,078 A * | 8/1967 | Crompton | 290/44 |
| 3,473,038 A * | 10/1969 | Hakkarinen | 290/44 |
| 4,236,866 A * | 12/1980 | Zapata Martinez | 415/4.4 |
| 4,309,146 A * | 1/1982 | Hein et al. | 415/4.4 |
| D300,932 S * | 5/1989 | Sikes | D15/1 |
| 4,834,610 A | 5/1989 | Bond, III | |
| 5,380,149 A * | 1/1995 | Valsamidis | 415/2.1 |
| 5,391,926 A | 2/1995 | Staley et al. | |
| 5,463,257 A * | 10/1995 | Yea | 290/55 |
| 6,015,258 A | 1/2000 | Taylor | |
| 6,465,899 B2 | 10/2002 | Roberts | |
| 6,666,650 B1 * | 12/2003 | Themel | 416/200 R |
| 6,740,989 B2 | 5/2004 | Rowe | |
| 6,870,280 B2 * | 3/2005 | Pechler | 290/55 |
| 7,132,760 B2 * | 11/2006 | Becker | 290/55 |
| 7,241,105 B1 * | 7/2007 | Vanderhye et al. | 415/4.2 |
| 7,287,954 B2 * | 10/2007 | Kinkaid et al. | 415/4.2 |
| 2001/0019693 A1 * | 9/2001 | Dial | 415/83 |
| 2002/0047276 A1 | 4/2002 | Elder | |
| 2008/0131273 A1 * | 6/2008 | Fuller | 415/203 |

FOREIGN PATENT DOCUMENTS

| | | |
|---|---|---|
| CA | 1126656 | 6/1982 |
| CA | 2349443 | 6/2001 |
| GB | 185939 A | 9/1922 |

* cited by examiner

Primary Examiner—Julio Gonzalez

(57) ABSTRACT

A wind turbine including a stator assembly having a plurality of stator blades for tangentially redirecting wind into a rotor assembly having a plurality of vertical rotor blades disposed circumferentially on a plurality of disks stacked one on top of each other. Each disk defines at least one opening thereon for redirecting the wind axially through each of the disks.

22 Claims, 7 Drawing Sheets

BOUNDARY LAYER WIND TURBINE

FIELD OF THE INVENTION

The present invention relates to wind turbines used to convert wind energy into mechanical energy, more specifically to vertical-axis turbines with stator devices that channel the air flow into a central rotor. The present invention design is based on the Coanda effect in fluids which translates into a more efficient vertical-axis turbine.

BACKGROUND OF THE INVENTION

Wind as a source of energy is a concept that has been promoted from ancient time. According to historical sources, there is evidence which shows that windmills were in use in Babylon and in China as early as 2000 B.C.

Wind is used as a source of energy for driving horizontal axis and vertical axis windmills. Horizontal axis windmills have been used extensively to drive electrical generators, however they suffer from several disadvantages, including the need for an even horizontal air inflow, danger to birds and air traffic, obscuring the landscape with banks of rotating windmills, and in the case of large diameter horizontal axis propellers, supersonic speeds at the tips of the rotors.

Vertical axis wind turbines (VAWT) have been provided in the prior art with a central rotor surrounded by stationary devices that serve to redirect and compress air flow toward the rotor blades.

Compared to VAWT where its exposure remains constant regardless of the wind direction, the horizontal axis windmill must turn to face the wind direction, which is considered as a disadvantage as there are additional moving parts involved in the construction.

An example of vertical axis wind turbine is shown in U.S. Pat. No. 5,391,926 to Staley et al. that uses double curved stator blades to direct wind current to the rotor assembly and to increase structure stability of the thin stator blades.

U.S. Pat. No. 6,015,258 to Taylor discloses another wind turbine that includes a ring of stator blades of an airfoil shape to reduce impedance of air directed towards the central rotor assembly.

Further, U.S. Patent Application Publication No. 2002/0047276 A1 (ELDER) discloses an outer ring of planar stator blades to direct flow of wind into a central rotor assembly.

Canadian Patent No. 1,126,656 (SHARAK) discloses a vertical axis turbine with stator blades that redirect the air to the rotor blades by straight extending vertical air guide panels that intermittently surround the rotor unit and direct air currents to the rotor unit for rotation by the wind. The air guide panels are closed at the top and bottom by horizontally extending guide panels that are canted in complementary directions. The upper panel is tilted downwardly as it progresses inwardly and the lower panel is tilted upwardly on its inward extent to thereby increase the velocity and pressure of the wind as it is directed to the rotor unit.

Another Canadian Patent Application No. 2,349,443 (TETRAULT) discloses a new concept of vertical axis wind turbine comprising an air intake module, which redirects the airflow vertically to a series of rings with parabolic evacuations. One of the major drawbacks of that design is the fact that the air intake module needs to face the wind, so it requires a yaw mechanism to orient it into the wind. Moreover, the whole design forces the airflow to change its direction from horizontal to vertical into a sort of internal enclosure from where the air is evacuated by changing again its direction from vertical to horizontal. The numerous and drastic changes in airflow directions entail a power loss in the airflow and a reduction of the turbine efficiency, as the energy of the wind is transformed into rotation of the turbine only at the last airflow direction change.

A disadvantage of all the horizontal and vertical axis windmills of the prior art relates to their inability to use remaining energy left in the airflow after hitting the windmill blades. Ideally, the airflow exiting a blade will be reused again and again to a certain extent. Unfortunately, in most cases the prior art enables the capture of only a fraction, the first impulse, of the wind power.

A prior art that uses the fluids' properties to transform efficiently a linear fluid movement into a rotational mechanical movement is the turbine described in U.S. Pat. No. 1,061,142 accorded to Nikola Tesla in 1913. The Tesla turbine used a plurality of rotating disks enclosed inside a volute casing and the rotation of the turbine was due to a viscous high-pressured fluid, oil in Tesla experiments, directed tangentially to the disks. Unfortunately this previous art is not suited to capture wind energy for several reasons such as the air viscosity is too low, the normal wind speed is too low and the whole design with a casing enclosure and only one access opening is impractical for wind turbines.

OBJECTS OF THE INVETION

It is a preferred object of the present invention to provide a vertical axis wind turbine which enables the capture of wind energy after its first impulse by combining the windmills blades design with the disks turbine design to overcome the shortfalls of prior arts.

It is a further preferred object of the invention to provide a rotor assembly that is structurally reinforced.

It is further preferred object of the invention to provide a rotor assembly that is simply constructed of inexpensive light material.

SUMMARY OF THE INVENTION

According to the present invention, there is provided a wind turbine comprising:
  a) a stator assembly having a plurality of stator blades for tangentially redirecting wind into an enclosure formed by the stator blades; and
  b) a rotor assembly positioned within the enclosure formed by the stator blades, the rotor assembly having a plurality of vertical rotor blades disposed circumferentially on a plurality of stacked disks, each disk defining at least one opening thereon for redirecting the wind axially through each of the disks.

Preferably, a wind turbine according to the present invention is able to operate in very broad wind conditions, such as velocities up to 130 mph, and frequently changing wind directions. The device provides a reliable and effective means for directing air currents into the rotor assembly, which is attached directly to a vertical shaft.

In general terms, the invention involves various embodiments of a vertical-axis wind turbine. Preferably, the stator blades are designed with an inward sinuous shape curvature and an outward simple curvature. The stator blades are disposed around the rotor as such that, regardless of the wind direction, the air inflow will be redirected tangentially to the rotor to impart a higher rotational velocity and greater torque upon the turbine shaft. In a preferred embodiment, the upper top surface and lower bottom surface of the stator assembly is designed as hemispheres for maximum air inflow. The significant size difference between the inflow and the outflow openings of the air channels created by the stator blades create a natural compression and a substantial air speed increase that achieve higher efficiency even in low wind. The disposition of the stator blades also prevents the disruption of rotation by shielding the rotors from winds counter-directional to their rotation which may occur as the wind shifts. The turbine may be equipped with any number of stator blades, however a preferred embodiment has between six and twelve stator blades.

The vertical rotor assembly, in a preferred embodiment, consists of a series of modified Tesla disks each of them having a plurality of small curved blades disposed circumferentially on the disk and continued with small ribs helically disposed on the upper surface of the disk. Between two ribs on the upper surface there is a corresponding rib on the lower surface of the disk to extract the airflow energy through drag and viscous effect having as a result a high-efficient VAWT. The turbine may be equipped with any number of disks, however a preferred embodiment has at least 50 disks.

The stated invention acts to convert wind currents into mechanical energy used to directly act upon a water pump, or to drive an electrical generator for use as an alternate power source.

The invention as well as its numerous advantages will be better understood by reading of the following non-restrictive description of preferred embodiments made in reference to the appending drawings.

DETAILED DESCRIPTION OF THE INVENTION

Figure 1:
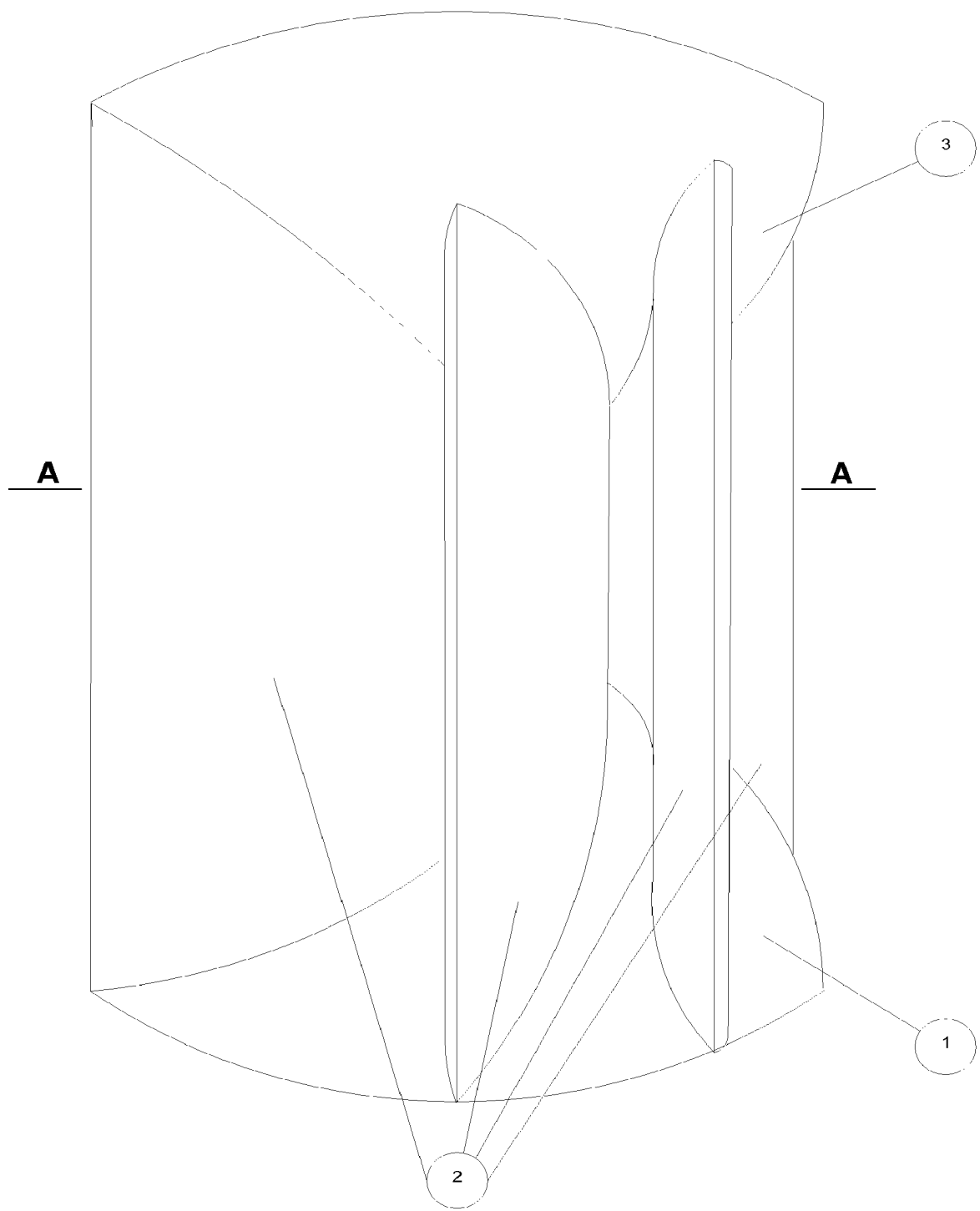
FIG. 1 is a perspective view of a vertical axis wind turbine as seen from exterior, where only the stator blades are visible, according to a preferred embodiment of the present invention.

FIG. 1 shows a vertical axis wind turbine as seen from exterior, where only the stator blades (2) are visible, according to a preferred embodiment of the present invention. The bottom surface (1) and the top surface (3) of the stator are shaped as hemispheres to create a maximum air inflow. These surfaces (1 and 3) may alternatively be truncated cones or elliptical surfaces.

Figure 2:
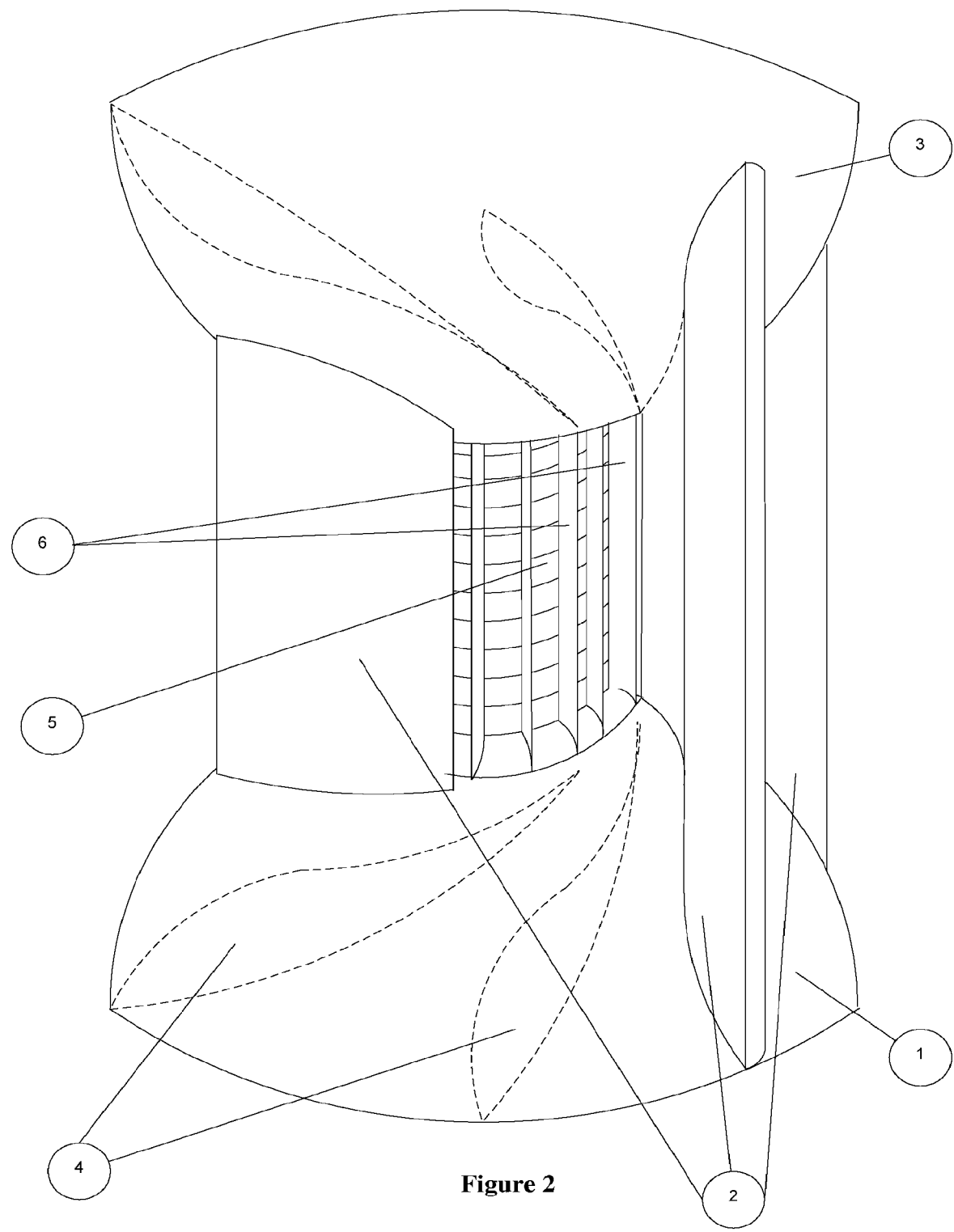
FIG. 2 is another perspective view of the vertical axis wind turbine shown in FIG. 1, where two stator blades are removed to make the rotor assembly visible.

FIG. 2 shows the vertical axis wind turbine where two stator blades (4) were removed to make the rotor (5) visible. The traces (4) of the removed stator blades (2) are shown on the bottom surface (1) and on the top surface (3). The presented stator blades orientation is counter clockwise. It will be understood of course that the orientation of the stator blades (2) and rotor blades (6) may be reversed to drive the turbine in a clockwise direction if desired.

Figure 3:
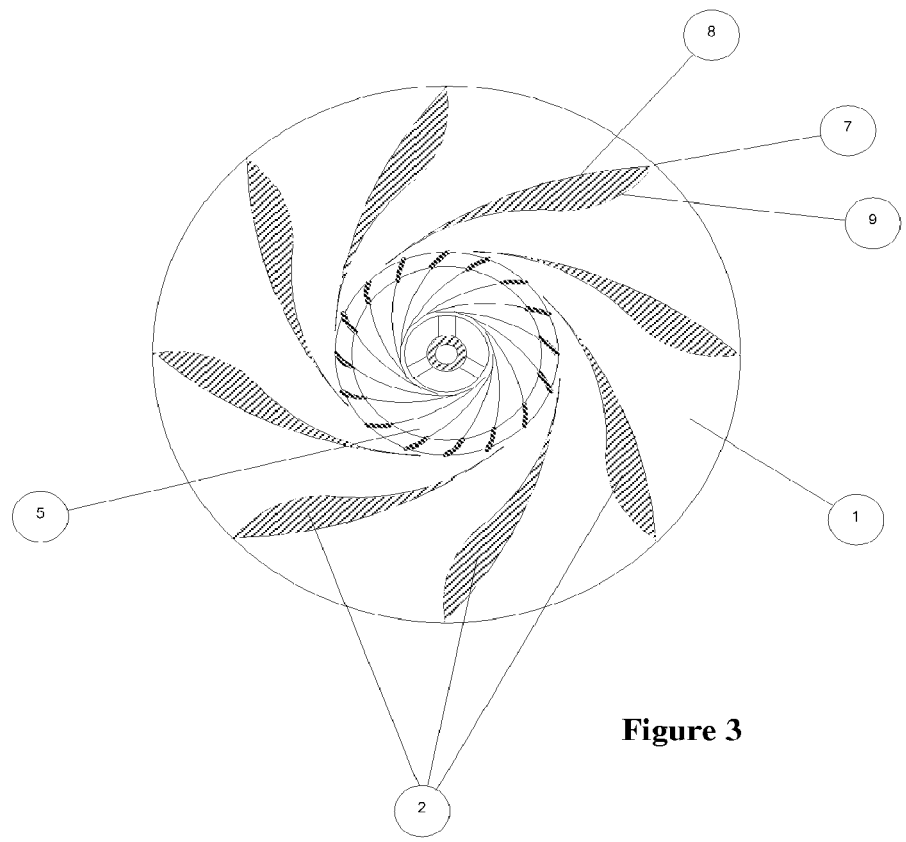
FIG. 3 is a horizontal sectional view on the line A-A of FIG. 1, showing the disposition of stator blades around the rotor as such that the air inflow will be redirected tangentially to the rotor.

FIG. 3 is a horizontal sectional view on the line A-A of FIG. 1, showing the disposition of stator blades (2) on the hemisphere lower surface (1) and around the rotor (5) as such that, regardless of the wind direction, the air inflow will be redirected tangentially to the rotor (5). Each stator blade (2) has a vertical edge (7) which when facing the wind will redirect the air flow into two different air channels. The outward surface (8) has a smooth convex curvature between the exterior point of the stator blade and the tangential point of the rotor circumference. The inward surface (9) has a sinuous shape curvature, convex near the external edge and concave in the vicinity of the rotor. This sinuous shape curvature, based on Coanda effect, will redirect the air inflow tangentially to the rotor. The presented design with different inward and outward curvature shapes creates an air flow channel with a large inflow opening and a fairly narrow outflow opening. The significant size difference between the inflow and the outflow openings will create a natural compression and a substantial air speed increase that translates into a steady rotation of the turbine even in low wind. The tangential disposition of the stator blades around the rotor and their inward concave curvature in the vicinity of the rotor, based again on Coanda effect, will create a natural enclosure which will keep the rotating air flow a longer period between the disks allowing extracting more of the wind energy, increasing the turbine efficiency.

Figure 4:
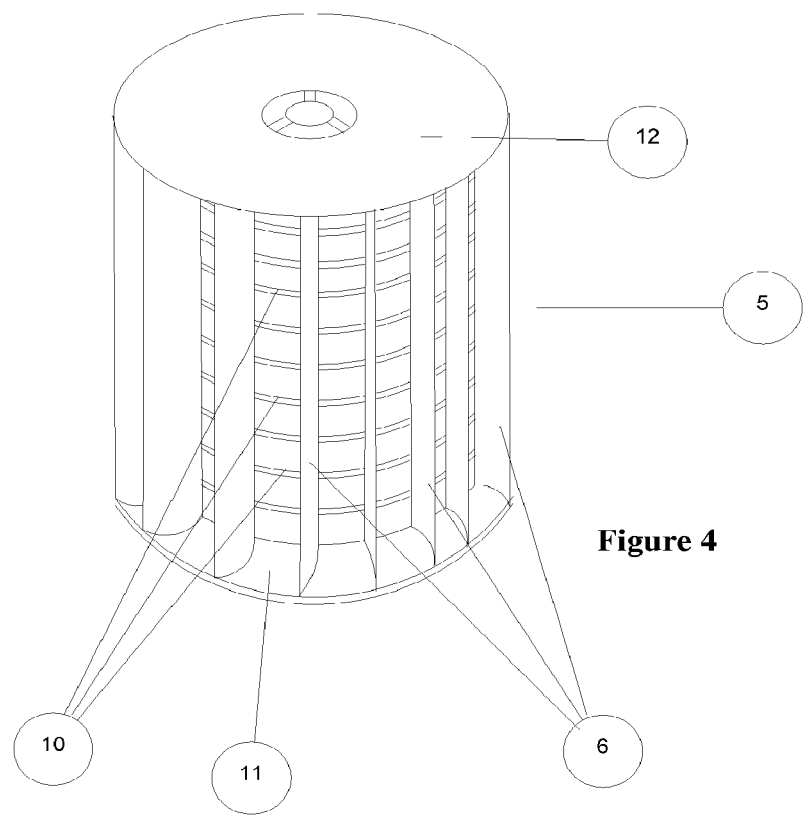
FIG. 4 is a perspective view of the rotor with its plurality of small blades and disks.

FIG. 4 shows the assembled rotor (5) with a plurality of horizontal disks (10) and a plurality of narrow vertical blades (6) disposed on the circumference of the disks, bordered vertically by a bottom disk (11) and a top disk (12). The diameter of the top and bottom disks 11 and 12 is larger than the diameter of the internal disks (10) as such that with the vertical blades (6) it creates a cylindrical structure. The vertical blades (6) have a concave curvature to receive the tangential air flow imparted by the stator air channels. It is understood that the blades may be designed with a specific angle from the vertical. A vertical shaft passes through the center of each disk. The rotor is preferably manufactured from a corrosion resistant light material, such as reinforced fiber glass composite, to rotate very easily even in slow wind.

Figure 5:
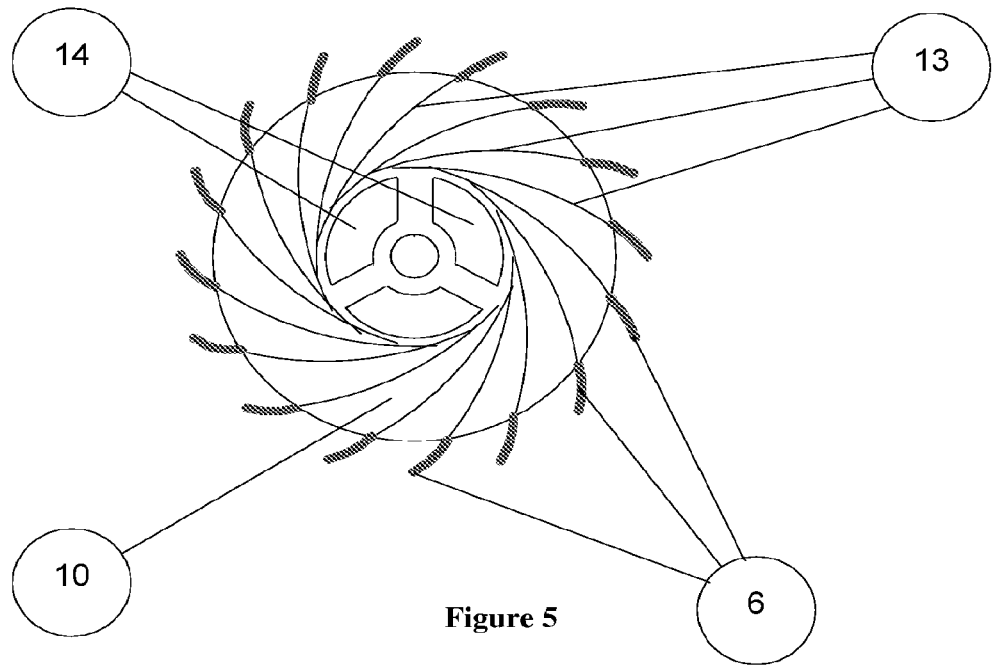
FIG. 5 is a top view of a disk presenting the small blades continued with the ribs.

FIG. 5 is a top view of a single internal disk presenting the small blades (6) uniformly distributed on the circumference of the disk. Each blade is continued with a rib (3) created on the upper surface of the disk (1O). The disk may be equipped with any number of blades (6), however in the preferred embodiment the number of blades (6) is the double of the number of stator blades (2) from FIG. 3. Similar to Tesla disks, each disk has three arc-sector openings (4) to let the air circulate between the disks. The ribs (3) are disposed in a helical arrangement from the small blade (6) on the circumference of the disk to the outer circumference of the openings (4).

Figure 6:
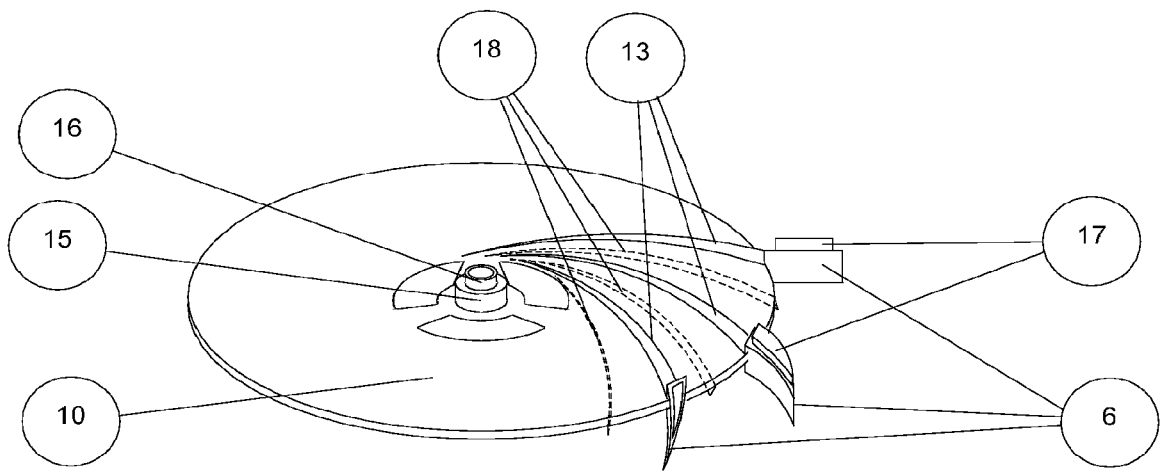
FIG. 6 is a perspective view of a disk presenting only three small blades and the corresponding ribs on the upper and lower surface.

FIG. 6 is a perspective view of a disk (1O) presenting only three small blades (6) and the corresponding ribs (13) on the upper surface. Moreover, FIG. 6 presents also in dotted lines the corresponding ribs (18) on the lower surface of the disk. Each of the small blades (6) has a top reduction (17) for easy assembly into the corresponding blade of the nearest upper disk in the rotor. Similarly, the central flange (15) of the disk has a reduction (16) that will be inserted into the central flange of the upper disk. In the final assembly the plurality of small blades that are mounted one on top of the other create the narrow vertical blades (6) as shown in FIG. 4. In addition to having a very easy assembly method for the rotor, the whole structure is well reinforced as each disk is tightly coupled with its corresponding top and bottom disk on the central flange as well as on a plurality of points uniformly distributed on the circumference. The upper disk (12) and the lower disk (11) of FIG. 4 have the corresponding design to complete the described simple assembly of the rotor structure.

Figure 7:
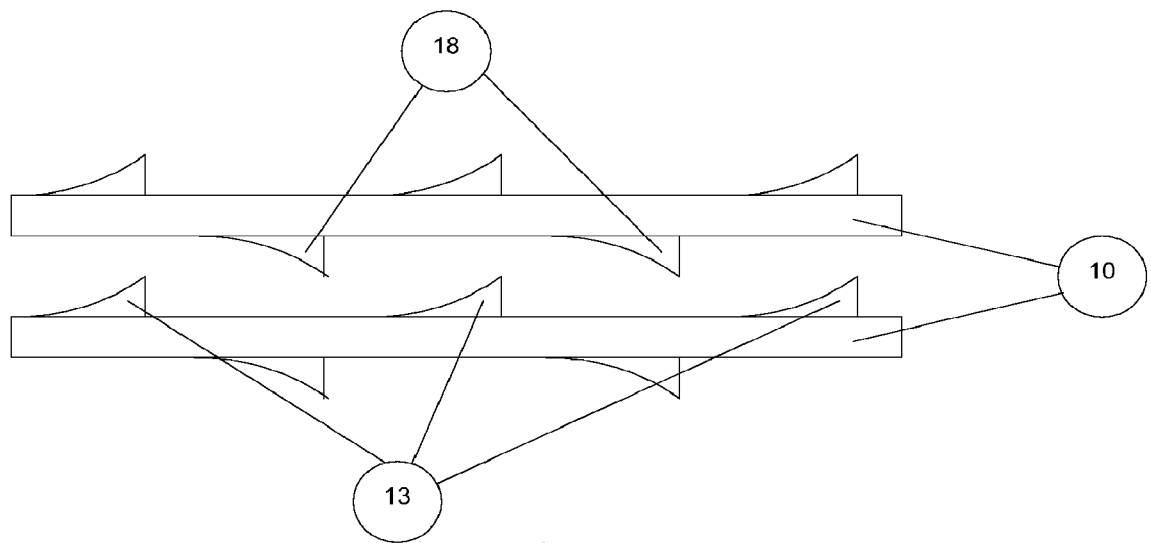
FIG. 7 is a front view of disposition of a limited number of ribs between two disks.
Figure 8:
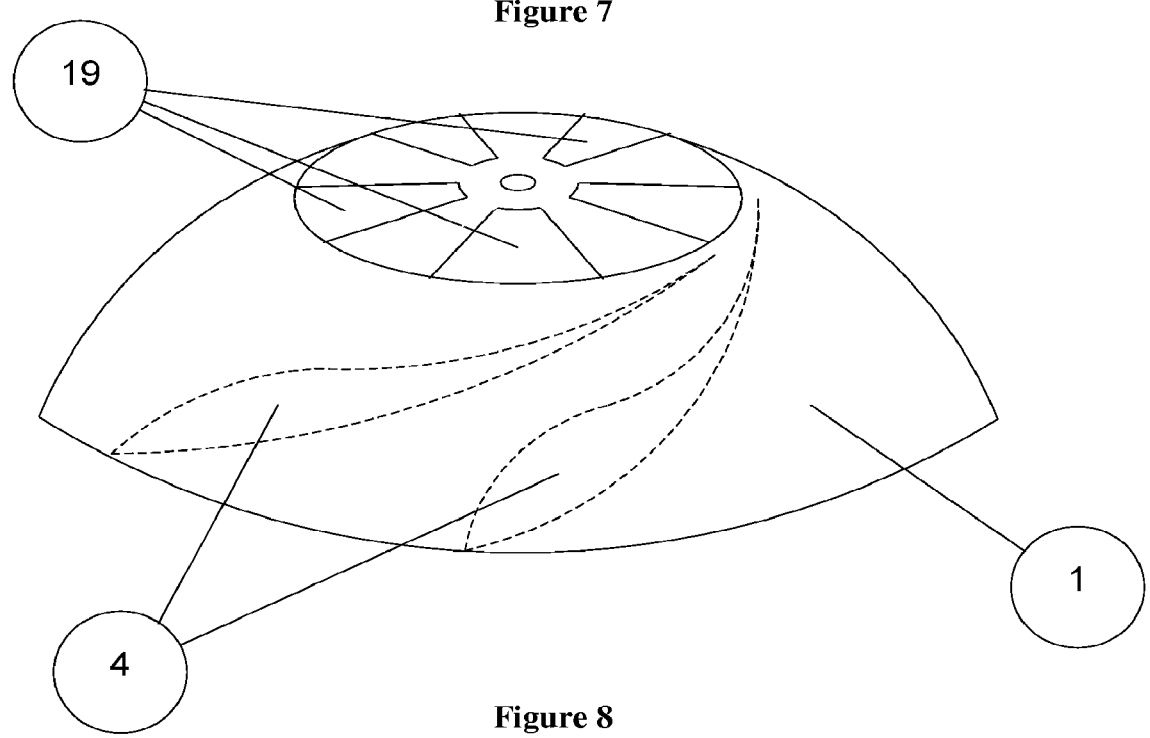
FIG. 8 is a perspective view of a top or bottom hemisphere presenting the multiple openings for air flow escape.

Turning back to the explanation that disposition of the stator blades around the rotor creates a natural enclosure which keeps the rotating air flow a longer period between the disks, FIG. 7 shows how the arrangement of the upper ribs (13) and the lower ribs (18) of two disks (10) helps the rotor gain additional velocity. The air flow imparted tangentially to the rotor by the air channels created by the stators (2) from FIG. 3, hit with its first impulse the vertical narrow blades (6) from FIG. 4 and then enter in the space between two disks (10) of the rotor (5). The air flow creates a laminar region on the surface of each disk that extends up to 0.03 inch (0.762 mm) thick. Doubling that for the two disks and considering a transition layer, the distance between two disks is best set to be less than 0.1 inches (2.54 mm). However, the turbine will rotate in the wind even with wider disks distances. Due to Coanda effect created by the disks as well as the stator blades enclosure, the air is entrapped for a certain period in-between the disks and will hit again and again the upper and lower ribs of the disks adding rotational velocity to the rotor. Then the air will pass through the openings of the disks and will create a vortex that will contribute to increase the rotation of the turbine and as a consequence its efficiency. The air currents vortex will be able to escape from said enclosure through the plurality of openings (19) created in the top and bottom surfaces (1) as shown in FIG. 8. In FIG. 8 it is shown the trace of two stator blades (4) on the bottom surface (1).

Through experimentation it has been estimated that the optimal number of stator blades (2) is between 6 and 12 with up to a double number of rotor blades (6) in order to avoid excessive complexity of construction. The rotor disks are preferably made from a light non-corrosive material, preferably a light polymer. The stator structure is preferably made from a more resistant non-corrosive material, such as a stronger type of polymer. The whole vertical axis turbine may be made from inexpensive plastic material to create a cost effective alternate power source.

Although the above description relates to a specific preferred embodiment as presently contemplated by the inventor, it will be understood that the invention in its broad aspect includes mechanical and functional equivalents of the elements described herein.

Without limiting the possibilities of alternate embodiments, it is described below some of such functional equivalents of the boundary layer vertical axis turbine.

Figure 9:
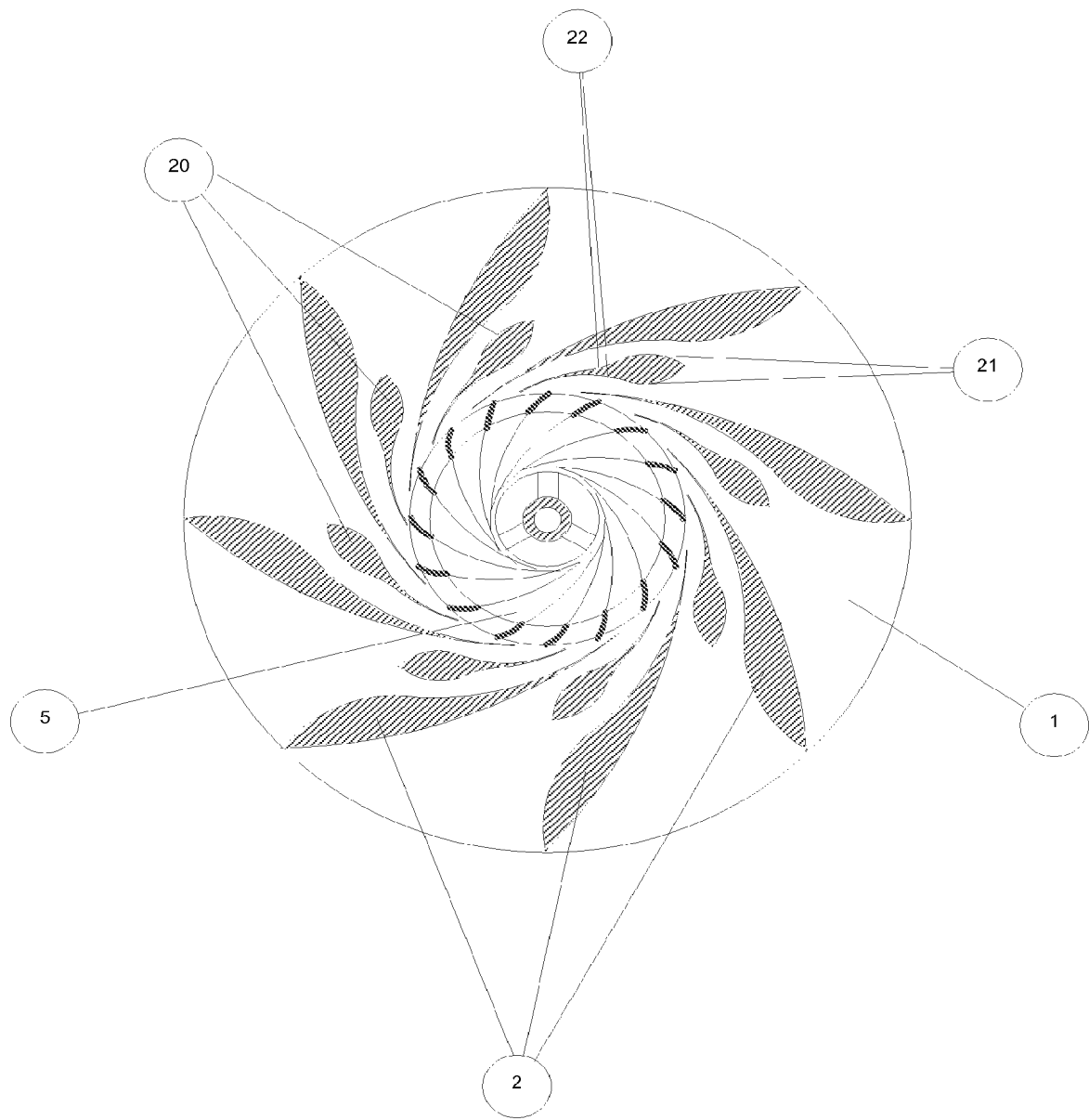
FIG. 9 is a horizontal sectional view of an alternate embodiment for the stator, showing the disposition of stator blades and the nozzles blades around the rotor as such that the air inflow will be redirected tangentially to the rotor.
Figure 10:
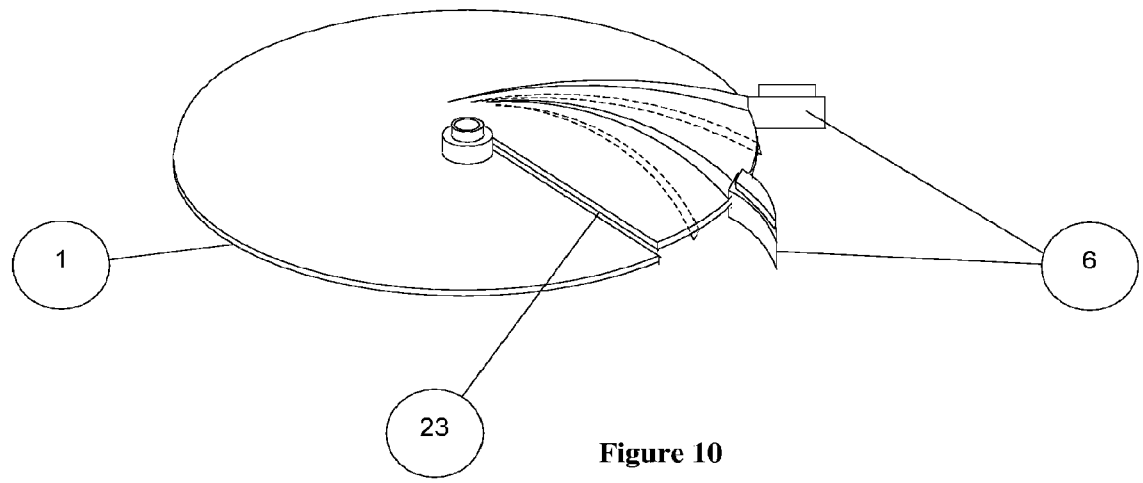
FIG. 10 is a perspective view of an alternate embodiment for disk with a helical surface presenting only three small blades and the corresponding ribs on the upper and lower surface.
Figure 11:
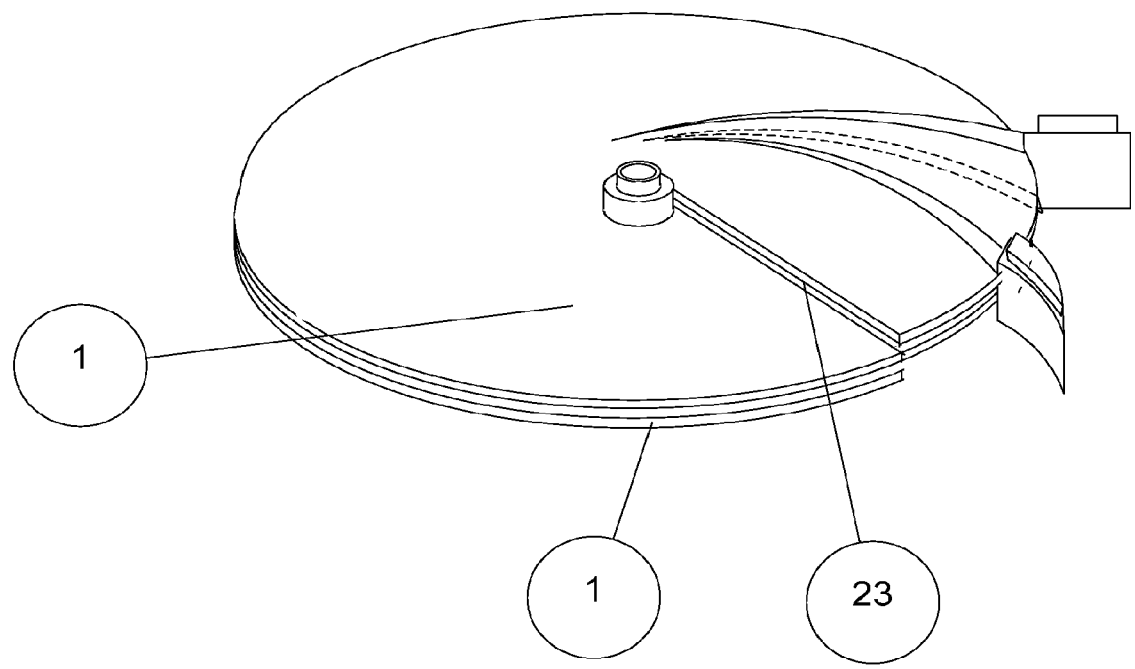
FIG. 11 is a perspective view of an alternate embodiment for two assembled disks with a helical surface.

In alternate embodiments of the turbine:
the top and lower surface of the stator may be designed with one complete circular hole for better evacuation of the air vortex created by the rotor openings;
the disposition of the stator blades may be designed (FIG. 9) as such that only half of the stator blades (2) are disposed on the exterior circumference of the stator. Between two of such exterior blades, near the outflow opening are placed an additional blade (20) which acts as a nozzle to increase the air flow speed. The nozzle is designed with sinuous curvatures on both sides in a convergent (21) divergent (22) pattern for the airflow. In this configuration the air outflow has increased velocity on the rotor (5). The FIG. 9 shows also the bottom surface (1) of the stator;
the narrow blades on the circumference of the rotor may be designed with a certain angle from the vertical and having a certain twist of the surface to increase the drag and lift effect;
the surfaces of the rotor to create the boundary layer effect may be designed in different shapes instead of disks;
the disk openings may have any shape instead of arc sectors;
the rotor may be designed in a shaftless configuration with a complete circle whole in the middle instead of the arc sector openings. In this configuration the rotor structure is well reinforced as each disk is tightly coupled with its corresponding top and bottom disk on the plurality of points uniformly distributed on the circumference. The rotor has a top and bottom shaft attached to the corresponding top and bottom disks;
the disks can be designed without any central openings but with a radial cut from the central flange to the circumference as shown in FIG. 10. The disk surface (1) is split vertically along the radial cut (23) with the same disk gap as described in the preferred embodiment. The radial cut (23) is placed between two of the rotor blades (6) The FIG. 11 shows that the assembly of a plurality of disks (1) with such radial cut disks (23) creates a helical surface which guides the air flow upward or downward without any need for central openings in the disks.
the wind turbine can be disposed horizontally or at an angle with respect to the vertical with only one inflow opening facing the wind. Such embodiment may be used in places where the wind is known to have only one direction or it may be used in a configuration where the turbine is placed on objects in motion (such as cars, boats, etc.) to generate the required electrical power.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

The invention claimed is:

1. A wind turbine comprising:
a) a stator assembly having a plurality of stator blades for tangentially redirecting wind into an enclosure formed by the stator blades; and
b) a rotor assembly positioned within the enclosure formed by the stator blades, the rotor assembly having a plurality of stacked disks connected to a shaft means, the stacked disks being closely spaced from each other so as to create, in use, a boundary layer effect on surfaces of the disks that contributes in rotating the disks, each disk having a plurality of rotor blades disposed on an outer circumference thereof, each disk defining at least one opening thereon for redirecting the wind axially through each of the disks;
whereby, in use, the stator blades redirect the wind tangentially to the rotor assembly and entirely within the enclosure formed by the stator blades before the wind is redirected axially through each of the disks.

2. The wind turbine according to claim 1, wherein the rotor assembly is adapted to rotate about a vertical axis and the stator blades are positioned vertically.

3. The wind turbine according to claim 1, wherein the rotor assembly is adapted to rotate about a horizontal axis and the stator blades are positioned horizontally.

4. The wind turbine according to claim 2, wherein each of the stator blades has an outward surface with a convex curvature between an exterior point of the stator blade and a tangential point of a rotor circumference and an inward surface with a sinuous shape curvature being convex near an external edge of the stator blade and concave near the rotor circumference.

5. The wind turbine according to claim 2, wherein the stator assembly comprises top and bottom surfaces containing a plurality of openings to permit air currents to escape from said rotor assembly.

6. The wind turbine according to claim 5, wherein the top and bottom surfaces are hemispheres surfaces.

7. The wind turbine according to claim 5, wherein the top and bottom surfaces are truncated cones surfaces.

8. The wind turbine according to claim 5, wherein the top and bottom surfaces are elliptical surfaces.

9. The wind turbine according to claim 2, wherein each of the disks has an upper surface provided with ribs for redirecting the wind.

10. The wind turbine according to claim 9, wherein each of the disks has a lower surface provided with ribs for redirecting the wind.

11. The wind turbine according to claim 2, wherein each of the disks has a lower surface provided with ribs for redirecting the wind.

12. The wind turbine according to claim 11, wherein each of the disks has an upper surface provided with ribs for redirecting the wind.

13. The wind turbine according to claim 2, wherein each rotor blade of each disk is continued with a rib helically disposed on one surface of each disk.

14. The wind turbine according to claim 13, wherein between two ribs on the one surface of each disk there is provided a corresponding rib on the other surface of each disk.

15. The wind turbine according to claim 13, wherein each rotor blade of each disk is adapted to be assembled into corresponding blades of upper and lower disks of the rotor.

16. The wind turbine according to claim 2, wherein a diameter of top and bottom disks is larger than the diameter of intermediate disks.

17. The wind turbine according to claim 2, wherein the rotor blades have a concave curvature for receiving a tangential air flow redirected by the stator assembly.

18. The wind turbine according to claim 2, wherein the rotor assembly is attached via a shaft to an electrical generator.

19. The wind turbine according to claim 2, wherein each of the disks defines a plurality of openings positioned near a center thereof.

20. The wind turbine according to claim 2, wherein each of the disks has a helical shape with a radial opening extending from a central flange to a circumference thereof.

21. The wind turbine according to claim 1, wherein the shaft means includes a shaft and the stacked disks are mountably connected to the shaft.

22. The wind turbine according to claim 1, wherein the shaft means includes portions of the stacked disks that are coupled to one another to define a virtual shaft.

* * * * *